(12) United States Patent
Neemann et al.

(10) Patent No.: US 12,053,880 B2
(45) Date of Patent: Aug. 6, 2024

(54) MOBILE ROBOT PLATFORM

(71) Applicant: Broetje-Automation GmbH, Rastede (DE)

(72) Inventors: Volker Neemann, Westerstede (DE); Norbert Tabeling, Cappeln (DE)

(73) Assignee: Broetje-Automation GmbH, Rastede (DE)

( * ) Notice: Subject to any disclaimer, the term of this patent is extended or adjusted under 35 U.S.C. 154(b) by 460 days.

(21) Appl. No.: 17/414,664

(22) PCT Filed: Sep. 10, 2019

(86) PCT No.: PCT/EP2019/074074
§ 371 (c)(1),
(2) Date: Jun. 16, 2021

(87) PCT Pub. No.: WO2020/126129
PCT Pub. Date: Jun. 25, 2020

(65) Prior Publication Data
US 2022/0016755 A1 Jan. 20, 2022

(30) Foreign Application Priority Data
Dec. 19, 2018 (DE) ............... 10 2018 132 990.3

(51) Int. Cl.
*B25J 5/00* (2006.01)
*B21J 15/14* (2006.01)
(Continued)

(52) U.S. Cl.
CPC ............. *B25J 5/007* (2013.01); *B21J 15/142* (2013.01); *B25J 9/042* (2013.01); *B64F 5/50* (2017.01)

(58) Field of Classification Search
CPC .......... B25J 5/007; B25J 9/042; B21J 15/142; B64F 5/50; B64F 5/00
See application file for complete search history.

(56) References Cited

U.S. PATENT DOCUMENTS

2009/0010285 A1* 1/2009 Dubois ............... G10K 15/046
356/614
2009/0287352 A1 11/2009 Geist et al.
(Continued)

FOREIGN PATENT DOCUMENTS

DE 1208464 1/1966
DE 2745404 6/1979
(Continued)

OTHER PUBLICATIONS

"German Search Report," for German Patent Application No. 102018132990.3 mailed Sep. 20, 2019 (7 pages).
(Continued)

*Primary Examiner* — Kira Nguyen
(74) *Attorney, Agent, or Firm* — Pauly, DeVries Smith & Deffner LLC

(57) ABSTRACT

Embodiments provide a mobile robot platform for processing an aircraft structural component with a robot, with a platform which can be moved on a floor in a horizontal movement direction, and with a height adjustment unit, arranged on the platform, the robot being arranged in a vertically adjustable fashion on the height adjustment unit and in at least one processing mode of the mobile robot platform the height adjustment unit is arranged in a non-pivoting fashion with respect to the platform, the robot having robot kinematics for positioning an end effector, and the robot kinematics having a first robot joint with a first robot limb, which is mounted ahead of the first robot joint, and with a second robot limb, which is mounted after the first robot joint, and a second robot joint ahead of which the second robot limb is mounted and after which a third robot limb is mounted.

19 Claims, 4 Drawing Sheets

(51) Int. Cl.
  *B25J 9/04* (2006.01)
  *B64F 5/50* (2017.01)

(56) References Cited

U.S. PATENT DOCUMENTS

| | | |
|---|---|---|
| 2011/0010007 A1 | 1/2011 | Sarh et al. |
| 2011/0110754 A1 | 5/2011 | Lin et al. |
| 2014/0100695 A1* | 4/2014 | Batt ................ B30B 15/044 700/258 |
| 2015/0367516 A1* | 12/2015 | Sarh ................ B25J 9/1697 414/743 |
| 2017/0106924 A1* | 4/2017 | Hafenrichter ........ B25J 15/0019 |
| 2019/0168388 A1* | 6/2019 | Pringle, IV ......... B25J 17/0283 |
| 2019/0331620 A1* | 10/2019 | Troy .................. G01S 17/08 |

FOREIGN PATENT DOCUMENTS

| | | |
|---|---|---|
| DE | 68901950.5 | 8/1992 |
| DE | 4426988 | 3/1995 |
| DE | 102004056285 | 5/2006 |
| DE | 102016218180 | 3/2017 |
| DE | 202016105302.1 | 1/2018 |
| DE | 102016118785 | 4/2018 |
| EP | 2345881 | 8/2012 |
| WO | 9114539 | 10/1991 |
| WO | 9636461 | 11/1996 |
| WO | 2020126129 | 6/2020 |

OTHER PUBLICATIONS

"International Search Report and Written Opinion," for PCT Application No. PCT/EP2019/074074 mailed Dec. 2, 2019 (13 pages).

* cited by examiner

MOBILE ROBOT PLATFORM

CROSS-REFERENCE TO RELATED APPLICATIONS

This application is a national stage application under 35 U.S.C. 371 of International Patent Application Serial No. PCT/EP2019/074074, entitled "Mobile Robot Platform," filed Sep. 10, 2019, which claims priority from German Patent Application No. DE 10 2018 132 990.3, filed Dec. 19, 2018, the disclosure of which is incorporated herein by reference.

FIELD OF THE TECHNOLOGY

The disclosure relates to a mobile robot platform for processing an aircraft structural component, to a robot arrangement, in particular mobile robot platform, for processing an aircraft structural component, and to a method for processing an aircraft structural component with a mobile robot platform.

BACKGROUND

The use of mobile robot platforms for processing aircraft structural components is already known. With these aircraft structural components, a robot is generally arranged on a platform. The platform can then be moved to various processing stations and the robot can process an aircraft structural component section by section at said stations. Some mobile robot platforms also have a height adjustment unit with which the robot can be adjusted vertically in order to increase its working range.

Aircraft structural components are generally large, frequently flat, components. These can be stringers, fuselage segments and/or wing segments. In addition, the end effectors for processing aircraft structural components have to a certain extent a large weight and/or large processing forces occur during processing. This therefore has a stronger effect the greater the range of the robot and therefore also its working range. However, when processing aircraft structural components, large working ranges are of decisive significance for the productivity of the system because they permit frequent movement of the mobile robot platform to be avoided.

For example a mobile robot platform which has a height adjustment unit on which a particularly rigid articulated arm robot is arranged has become known. This articulated arm robot is known from DE 10 2016 118 785 A1. The disadvantage with this mobile robot platform is that its movement space and working range are limited for design reasons.

SUMMARY

The disclosure is based on the problem of configuring and developing the known mobile robot platform in such a way that it covers the largest possible working range and at the same time can also bear end effectors which have a large weight and/or can absorb large process forces.

The above problem is achieved with a mobile robot platform as described herein.

Due to the provision of the height adjustment unit and the vertically adjustable arrangement of the robot thereon as well as the specific configuration of the robot kinematics, a mobile robot platform is provided which not only provides a large working range but can also bear end effectors which have a large weight and/or can absorb large processing forces.

In various embodiments, the rotational axes of the first, second and third robot joints are oriented transversely, essentially orthogonally, with respect to the horizontal and/or parallel to the vertical adjustment direction. This provides a robot in the manner of a Scara robot by way of which the adjustment drives are loaded as little as possible by large loads and/or processing forces.

The vertical adjustment is implemented here on the platform side. According to one development, the height adjustment unit is linearly adjustable, as described herein. As a result, the workpiece changing process (changing of the aircraft structural component) can be simplified by lifting up the entire robot.

Various embodiments relate to a parked position and movement position as well as to processing positions of the robot.

Various embodiments describe advantageous developments of the end effector which provide advantages during processing which depend on the aircraft structural component.

Various embodiments relate to advantageous developments of the platform, and some embodiments relate to the referencing between the mobile robot platform and the aircraft structural component which is to be processed.

According to further embodiments, the above problem is achieved with a robot arrangement, in particular mobile robot platform, for processing an aircraft structural component by the features described herein. With respect to the advantages and refinements, reference can be made to the statements relating to the mobile robot platform. All the statements in this regard also apply to the robot arrangement even if it is not a mobile robot platform.

According to further embodiments, the above problem is achieved with a method as described herein. With respect to the advantages and refinements, reference can be made to the mobile robot platform as proposed and to the robot arrangement as proposed.

Various embodiments provide a mobile robot platform for processing an aircraft structural component with a robot, with a platform which can be moved on a floor in a horizontal movement direction, and with a height adjustment unit, arranged on the platform, for vertically adjusting the robot, the robot being arranged in a vertically adjustable fashion on the height adjustment unit and in at least one processing mode of the mobile robot platform the height adjustment unit is arranged in a non-pivoting fashion with respect to the platform, the robot having robot kinematics for positioning an end effector, and the robot kinematics having a first robot joint with a first robot limb, which is mounted ahead of the first robot joint, and with a second robot limb, which is mounted after the first robot joint, and a second robot joint ahead of which the second robot limb is mounted, and after which a third robot limb is mounted, wherein a third robot joint is mounted after the third robot limb, and wherein the first robot joint, the second robot joint and the third robot joint have essentially parallel rotational axes.

In some embodiments, the rotational axes of the first, second and third robot joints are oriented transversely, essentially orthogonally, with respect to the horizontal and/or parallel to the vertical adjustment direction.

In some embodiments, the height adjustment unit is linearly adjustable, in particular transversely, essentially orthogonally, with respect to the horizontal.

In some embodiments, the robot can be moved completely, including the end effector, into an area within the boundaries of a vertical projection of the platform.

In some embodiments, in at least one processing position the second robot limb extends laterally beyond the platform, wherein in at least one processing position the third robot limb is arranged laterally completely outside the platform.

In some embodiments, the end effector has at least one tool, a drill unit for drilling and/or milling the aircraft structural component and/or a riveting unit for riveting the aircraft structural component, a drill/riveting unit for drilling and riveting the aircraft structural component.

In some embodiments, the riveting unit and/or the drill/riveting unit has a riveting tool and a riveting opposing tool for riveting, wherein the end effector has a U-shaped tool receptacle, the riveting tool being arranged on one limb of the U-shaped tool receptacle, and the riveting opposing tool being arranged on the other limb of the U-shaped tool receptacle.

In some embodiments, the end effector points downward to the floor or upward from the floor, wherein the limbs of the U-shaped tool receptacle point downward to the floor or upward from the floor.

In some embodiments, the end effector has a first pivoting unit for pivoting the at least one tool about a rotational axis, wherein the rotational axis of the first pivoting unit is arranged transversely, in particular essentially orthogonally, with respect to the rotational axis of the third robot joint and/or runs through the tool center point of the end effector.

In some embodiments, the end effector has a second pivoting unit for pivoting the at least one tool about a rotational axis, wherein the rotational axis of the second pivoting unit is arranged transversely, in particular essentially orthogonally, with respect to the rotational axis of the first pivoting unit and/or runs through the tool center point of the end effector.

In some embodiments, the mobile robot platform is embodied so as to be self-propelled in the horizontal movement direction and/or can be moved by an external device.

In some embodiments, the mobile robot platform is supplied with power and/or compressed air from the outside.

In some embodiments, a rivet-provision unit, which provides rivet elements to the end effector via a transportation link, is arranged on the platform.

In some embodiments, the mobile robot platform, the robot, in particular the end effector, has a sensor, in particular a camera, for referencing the position and/or attitude of the aircraft structural component relative to the mobile robot platform and/or to the robot and/or to the end effector.

Various embodiments provide a robot arrangement, in particular mobile robot platform, for processing an aircraft structural component with a robot, with a height adjustment unit for vertically adjusting the robot, the robot being arranged in a vertically adjustable fashion on the height adjustment unit, the robot having robot kinematics for positioning an end effector with at least one tool, and the robot kinematics having a first robot joint with a first robot limb, which is mounted ahead of the first robot joint, and with a second robot limb, which is mounted after the first robot joint, and a second robot joint ahead of which the second robot limb is mounted and after which a third robot limb is mounted, wherein a third robot joint is mounted after the third robot limb, and wherein the first robot joint, the second robot joint and the third robot joint have essentially parallel rotational axes, and wherein the end effector has a first pivoting unit for pivoting the at least one tool about a rotational axis, wherein the rotational axis of the first pivoting unit is arranged inclined, transversely, essentially orthogonally, with respect to the rotational axis of the third robot joint and/or runs through the tool center point of the end effector.

Various embodiments provide a method for processing an aircraft structural component with a mobile robot platform with a robot, with a platform which can be moved on a floor in a horizontal movement direction, and with a height adjustment unit, arranged on the platform, for vertically adjusting the robot, the robot being arranged in a vertically adjustable fashion on the height adjustment unit, the robot having robot kinematics for positioning an end effector, and the robot kinematics having a first robot joint with a first robot limb, which is mounted ahead of the first robot joint, and with a second robot limb, which is mounted after the first robot joint, and a second robot joint ahead of which the second robot limb is mounted and after which a third robot limb is mounted, wherein a third robot joint is mounted after the third robot limb, and wherein the first robot joint, the second robot joint and the third robot joint have essentially parallel rotational axes, and the end effector processes the aircraft structural component.

In various embodiments, the mobile robot platform has a working range in which it can process a section of an aircraft structural component without being moved, wherein the aircraft structural component is arranged with one section in this working range and is processed in this section, wherein after the processing of this section the mobile robot platform is moved along the aircraft structural component, and the aircraft structural component is subsequently processed in a section which lies outside the working range of the previous processing.

BRIEF DESCRIPTION OF THE DRAWINGS

Aspects of the disclosure will be explained in more detail below with reference to a drawing which represents merely one exemplary embodiment. In the drawing.

DETAILED DESCRIPTION

Figure 1:
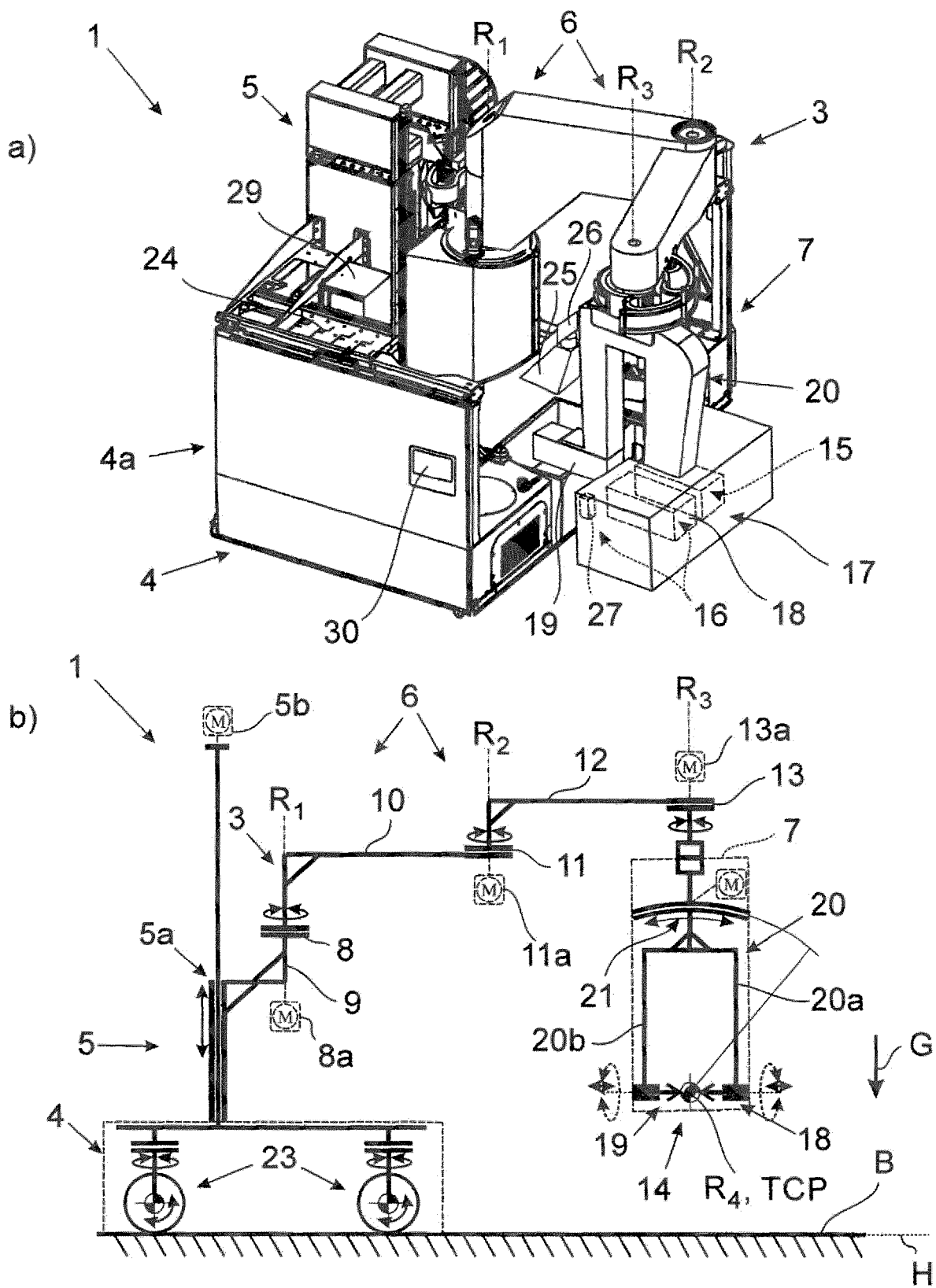
FIG. 1 a) shows a three-dimensional illustration of the mobile robot platform as proposed, b) shows the diagram of the kinematics of the mobile robot platform from FIG. 1a)

FIG. 1a) shows a robot arrangement as proposed in the form of a mobile robot platform 1 for processing an aircraft structural component 2. It has a robot 3, a platform 4 which can be moved on a floor B in a horizontal movement direction, and a height adjustment unit 5, arranged on the platform 4, for vertically adjusting the robot 3. The robot arrangement as proposed can have such a platform 4, but the height adjustment unit 5 can basically, for example, also be arranged on the floor B. The robot arrangement is also described below in conjunction with the mobile robot platform 1. All the statements relating to the mobile robot platform 1 are, however, also to apply to the robot arrangement, even if it does not have a movable platform.

A mobile robot platform 1 is understood to mean a robot platform 1 which can be moved to various processing stations to process aircraft structural components. Correspondingly, said robot platform 1 can be moved on a floor B in one and/or more horizontal movement directions. This free movement can occur here without mechanical guide means, such as for example rails.

The processing of an aircraft structural component 2 is understood here to mean processing of the aircraft structural component 2 in the narrower sense and/or production of the aircraft structural component 2. In particular, the processing can be mechanical processing of the aircraft structural component 2. In the exemplary embodiment, the processing is riveting and/or drilling and/or milling the aircraft structural component 2.

As can be inferred further from FIG. 1a), the robot 3 is arranged in a vertically adjustable fashion on the height adjustment unit 5. In one processing mode of the mobile robot platform 1 the height adjustment unit 5 can be arranged here at least in a non-pivoting fashion with respect to the platform 4. A processing mode is understood here to mean a state of the mobile robot platform 1 in which the mobile robot platform processes an aircraft structural component 2. In particular, this is not intended to include maintenance configurations. The height adjustment unit can be fundamentally non-pivoting or non-pivoting only in the processing mode. "Non-pivoting" means that the possibility of pivoting is excluded by mechanical means, in particular by means of a form fit and/or frictional fit and/or materially joined fit. The height adjustment unit 5 can be permanently connected to the platform 4. In the exemplary embodiment it serves to move the robot 3 linearly, in particular vertically. For this it can have a linear guide 5a, as can be inferred from the kinematic diagrammatic illustration in FIG. 1b).

In addition, in one variant (not illustrated here) there can be provision that the height adjustment unit 5 can be moved linearly in the horizontal H. As a result, the robot 3 can be adjusted not only in the vertical direction but also in the horizontal direction. Said robot 3 can then be embodied so as to be linearly movable along the longitudinal extent of the platform 4. This can then be done with a linear guide. The possibility of the height adjustment unit pivoting by means of an adjustment drive is not expressly provided here.

The robot 3 has, as proposed, robot kinematics 6 for positioning an end effector 7. Robot kinematics 6 can be serial kinematics here.

The robot kinematics 6 have a first robot joint 8, a first robot limb 9, which is mounted ahead of the first robot joint 8, and a second robot limb 10, which is mounted after the first robot joint 8. Furthermore, the robot kinematics 6 have a second robot joint 11 ahead of which the second robot limb 10 is mounted and after which a third robot limb 12 is mounted. As a result of the fact that a third robot joint 13 is mounted after the third robot limb 12, and that the first robot joint 8, the second robot joint 11 and the third robot joint 13 have essentially parallel rotational axes $R_1$, $R_2$, $R_3$, a robot 3 is provided which has a particularly large working range A and can bear an end effector 7 which has a large weight and/or can absorb large processing forces.

In the exemplary embodiment the robot kinematics 6 can have a fourth robot limb which is mounted after the third robot joint 13. The end effector 7 can be arranged here on this fourth robot limb, in particular via a coupling.

The robot 3 is, as in the exemplary embodiment, embodied in the manner of a Scara robot. The rotational axes $R_1$, $R_2$, $R_3$ of the first, second and third robot joints 8, 11, 13 can be oriented transversely with respect to the horizontal H and/or parallel to the vertical adjustment direction here. Transversely with respect to the horizontal can be to be understood here as meaning in the direction of gravity G and/or orthogonally with respect to the movement direction (s) of the platform 4.

In order to move and/or park the mobile robot platform 1 as safely as possible and to avoid a collision during the movement or as a result of other movable objects, the robot 3 can be folded up, as shown in FIG. 2b). The robot 3, in particular including the end effector 7, can be moved into an area within the boundaries of a vertical projection of the platform 4. Vertical is to be understood here as meaning orthogonal with respect to the horizontal and/or parallel to the direction of gravity. However, in alternative refinements at least the tool center point TCP and/or at least the third robot limb 12 can also be completely movable into an area within the boundaries of a vertical projection of the platform 4. This is a parked position and/or a movement position of the mobile robot platform 1. It is shown in FIG. 2b). During parking and/or movement in such a parked position or movement position, the platform 4 acts as a protection for the robot 3 and the end effector 7. As a result, possible collisions can be prevented and a colliding object would firstly collide with the platform 4, so that the robot 3 and/or the end effector 7 are/is protected. As a result, damage as a result of collisions can be avoided or considerably reduced. In order to increase the protective effect, the platform can have protection elements 4a, such as for example walls, projecting from the platform, in order to protect the end effector 7. These protection elements 4a can be arranged on lateral sides, which have a shorter extent than the longitudinal sides of the platform 4.

Figure 2:
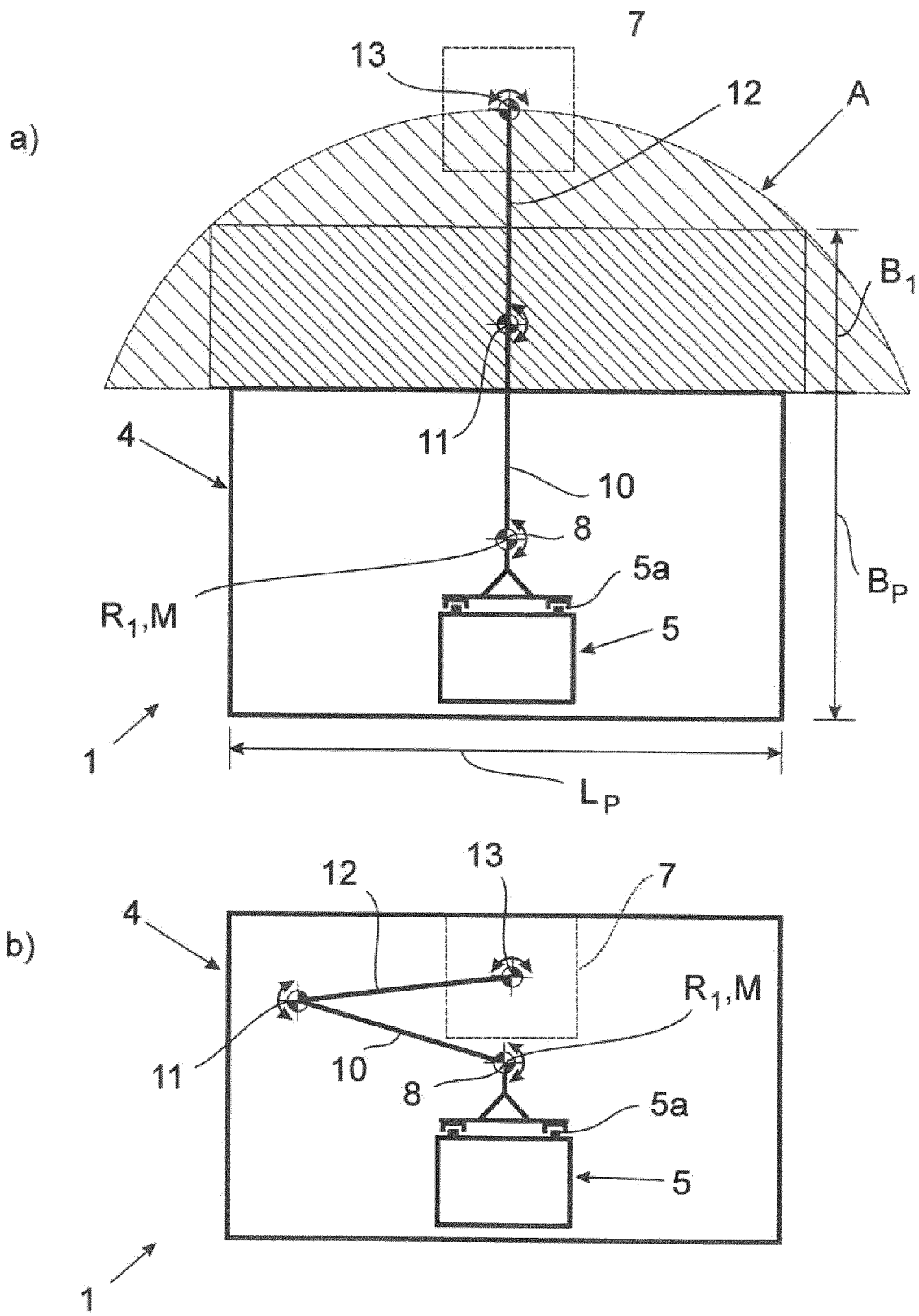
FIG. 2 shows a plan view from above in the direction of gravity of the mobile robot platform according to FIG. 1b with the robot in two different positions.

As shown in FIG. 2, the height adjustment unit 5 is, in a plan view of the mobile robot platform 1, arranged in the direction of gravity G with respect to the center point M of the platform 4 offset thereon. In a plan view of the mobile robot platform 1 in the direction of gravity G, the rotational axis $R_1$ of the first robot joint 8 can run past the center point M of the platform 4 at a maximum distance of 0.5 m. In the exemplary embodiments, this rotational axis $R_1$ particularly can run essentially through the center point M of the platform 4 in this plan view.

As shown in FIG. 2a), in at least one processing position the second robot limb 10 extends laterally beyond the platform 4. In at least one processing position the third robot limb 12 can also be arranged laterally completely outside the platform 4. In the parked position and/or movement position of FIG. 2b), said robot limb 12 can be arranged completely within the platform 4 here.

FIG. 2a) shows that the platform 4 extends along a longitudinal axis and that the working range A extends laterally with respect to the longitudinal axis and outside the platform 4 at least over the entire length $L_P$ of the platform 4. Said working range A is illustrated in FIG. 2a) from above with semicircular hatching. The working range A can extend laterally with respect to the longitudinal axis and outside the platform 4 to a width Bi outside the platform 4 of at least 50%, or at least 80%, of the width $B_P$ of the platform 4 and at least over the entire length $L_P$ of the platform 4. This results in particularly flexible fabrication, in particular for elongate aircraft structural components 2, as is described in more detail further below in connection with the processing method.

In the exemplary embodiment in FIG. 1, the mobile robot platform 1 has a working range A which extends over at least 6.5 m along the longitudinal axis of the mobile robot platform 1, over at least 2.8 m in the width direction of the mobile robot platform 1, and over at least 2.8 m in the vertical direction. In the exemplary embodiments in FIGS. 4$a$) and 4$b$), the mobile robot platform 1 has a working range A which extends over at least 6.5 m in the longitudinal direction of the mobile robot platform 1, over at least 2 m in the width direction of the mobile robot platform 1, and over at least 2.8 m in the vertical direction.

The end effector 7 has at least one tool 14. This may be, in particular, a tool 14 which mechanically processes the aircraft structural component 2. The end effector 7 can have a drill unit 15 for drilling and/or milling the aircraft structural component 2 and/or a riveting unit 16 for riveting the aircraft structural component 2. In addition or alternatively, the end effector 7 can have a milling unit for milling the aircraft structural component 2. A drill/riveting unit 17 for drilling or milling and riveting can be provided. The riveting unit 16 or the drill riveting unit 17 can be designed to generate the rivet connection on one side or on both sides. In the exemplary embodiment in FIGS. 1 to 3, the riveting unit 16 and/or the drill/riveting unit 17 has a riveting tool 18 and a riveting opposing tool 19 for riveting. Here, the end effector 7 has a U-shaped tool receptacle 20, wherein the riveting tool 18 is arranged on one limb 20$a$ of the U-shaped tool receptacle 20, and the riveting opposing tool 19 is arranged on the other limb 20$b$ of the U-shaped tool receptacle 20. The limbs 20$a$, 20$b$ extend here essentially orthogonally with respect to the horizontal H and/or parallel to the rotational axes $R_1$, $R_2$, $R_3$ of the first, second and third robot joints 8, 11, 13.

In the exemplary embodiment in FIG. 1, the end effector 7 points downward to the floor B. Here, the limbs 20$a$, 20$b$ of the U-shaped tool receptacle 20 point downward to the floor B or upward from the floor from the direction of the third robot joint 13.

The processing of the aircraft structural component 2 is carried out here at least on both sides in the case of riveting, with the riveting tool 18 from one side of the aircraft structural component 2, and with the riveting opposing tool 19 from the other side of the aircraft structural component 2.

Figure 4:
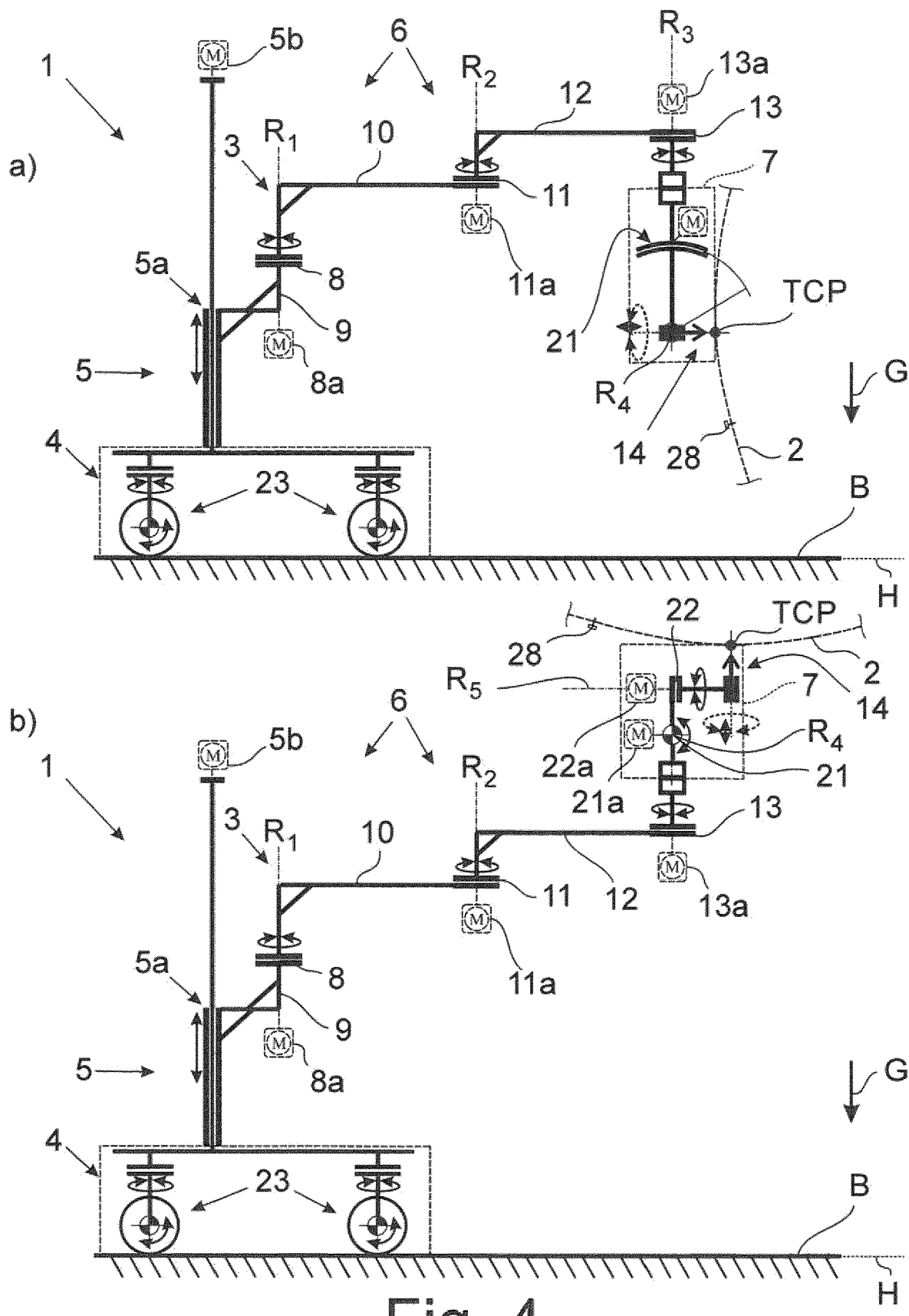

In the exemplary embodiments in FIG. 4, the end effectors 7 each have just one single-sided riveting unit 16. With said end effectors 7, it can be possible to produce such rivets for which just one tool 14 is required from one side of the aircraft structural component 2. In the exemplary embodiment in FIG. 4$a$) the processing of the aircraft structural component 2 is carried out from just one lateral side thereof. In the exemplary embodiment in FIG. 4$b$) the processing is carried out only from below. The end effector 7 points upward from the floor B or to the side from the direction of the third robot joint 13. This is also respectively illustrated in the figures.

The end effector 7 can have a first pivoting unit 21 here for pivoting the at least one tool 14. The pivoting unit 21 can have an arcuate guiding means. The pivoting can be easily implemented by this means. The arcuate guiding means can be in the form of a circular arc.

The rotational axis $R_4$, virtual in the exemplary embodiment in FIG. 1$b$), of the first pivoting unit 21 can be arranged inclined, here orthogonally, with respect to the rotational axis $R_3$ of the third robot joint 13. The rotational axis $R_4$ can run outside the pivoting unit 21. In the exemplary embodiment in FIG. 1$b$) and in the exemplary embodiment in FIG. 4$a$), the rotational axis $R_4$ of the first pivoting unit 21 runs through the tool center point TCP of the end effector 7. In various embodiments, the pivoting axis $R_4$ of the first pivoting unit 21 does not run further away from the tool center point TCP than 50%, 20%, or 5%, of the distance between the pivoting unit 21 and the tool center point TCP. Alternatively, the rotational axis $R_4$ of the first pivoting unit 21 can run through the first pivoting unit 21, as in the exemplary embodiment in FIG. 4.

In the exemplary embodiment in FIG. 1 and in the exemplary embodiment in FIG. 4$a$), the end effector 7 has just a first pivoting unit 21 for pivoting the at least one tool 14, wherein the tool 14 can process the aircraft structural component 2 as intended before and after the pivoting.

Alternatively, the end effector 7 can also have an additional second pivoting unit 22 for pivoting the at least one tool 14. The rotational axis $R_5$ of the second pivoting unit 22 can be arranged orthogonally here with respect to the rotational axis $R_4$ of the first pivoting unit 21 and/or runs through the tool center point TCP of the end effector 7. In the exemplary embodiment in FIG. 4$b$), the rotational axis $R_5$ of the second pivoting unit 22 runs through the second pivoting unit 22. The second pivoting unit 22 can be mounted after the first pivoting unit 21 in the kinematic chain leading to the end effector 7 here.

In this exemplary embodiment, the end effector 7 can have just two pivoting units 21, 22 for pivoting the at least one tool 14 of the end effector 7, wherein the tool 14 can process the aircraft structural component 2 as intended before and after the pivoting.

The mobile robot platform 1 can be embodied so as to be self-propelled in the horizontal movement direction or can be movable by an external device. In the exemplary embodiment, the platform 4 can have wheels 23 on which the mobile robot platform 1 is moved. Said wheels 23 are embodied here so as to be at least partially steerable and/or pivotable, such as to be all steerable and/or pivotable. Individual wheels 23 and/or all the wheels 23 can be driven in the case of a self-propelled mobile robot platform 1.

As an alternative to wheels 23, it is, for example, also possible to provide air cushion units not shown in the exemplary embodiments, after the activation of which units the mobile robot platform 1 can be moved on the floor B in the horizontal H.

During the processing of the aircraft structural component 2 the platform 4 can be lowered here and/or supports are extended so that it has a stable support. For movement to another processing station, the platform 4 can then, for example, be lifted relative to the wheels 23 and/or the supports can be retracted.

In order to permit aircraft structural components 2 to be processed as autonomously as possible by the mobile robot platform 1, the mobile robot platform 1 can be supplied here with power and/or compressed air from the outside. Just these two media, as are, if appropriate, additional data lines with which the mobile robot platform is supplied from the outside, in particular continuously.

In the exemplary embodiment, the platform 4 also has a rivet-provision unit 24. The latter makes available rivet elements to the end effector 7 via a transportation link. The transport can occur from the rivet-provision unit 24 to the end effector 7 via a hose. The rivet elements, can be different types of said elements, are stored in magazines in the rivet-provision unit 24. In this context, a magazine can have essentially riveting elements of the same designation.

Additionally or alternatively, the controller 29 of the mobile robot platform 1 is also arranged on the platform 4. Said controller 29 can control the platform 4, the height adjustment unit 5, the robot 3 and the end effector 7 here. This makes possible particularly autonomous processing of the aircraft structural component 2 by the mobile robot platform 1. The controller 29 can be operated from the outside by means of an operator control panel 30.

In order to check the method of functioning of the riveting unit 16 or drill/riveting unit 17, the mobile robot platform 1 can also have a test panel holder 25. A test panel 26 can be held by the latter, and the end effector 7 can perform a test drilling operation and/or test riveting operation thereon.

In addition, the platform 4 can have a drill lubricant device for supplying the end effector 7, in particular the drill unit 15 or drill/riveting unit 17 or milling unit with lubricant during the drilling process or milling process. Said lubricant is fed to the end effector 7 via hoses here.

Additionally or alternatively, the platform 4 can have a suction device for sucking away drilling chips and/or milling chips. Drilling chips and/or milling chips can be sucked away by said device through a hose from the end effector 7 into the suction device.

As already indicated, the mobile robot platform 1 can be moved to various processing stations. These can be arranged here along an aircraft structural component 2, as shown in FIG. 3.

In order to reference the position of a new aircraft structural component 2 with the mobile robot platform 1, in particular the end effector 7, after the movement and/or before the processing of said aircraft structural component 2, the mobile robot platform 1 has a sensor 27. Basically, the mobile robot platform 1, the platform 4, the robot 3, or the end effector 7, can have a sensor 27 for referencing the position and/or attitude of the aircraft structural component 2 relative to the mobile robot platform 1 and/or to the robot 3 and/or to the end effector 7. In the exemplary embodiment, the sensor 27 is a camera. The sensor 27 is arranged here on the end effector 7. The referencing is carried out in particular by means of reference rivets 28 and/or reference drilled holes on the aircraft structural component 2. Said drilled holes are sensed by the sensor 27 and the referencing is carried out on the basis of the orientation and/or position of said drilled holes.

Aircraft structural components 2 can be processed with the mobile robot platform 1 as follows. As already indicated, the mobile robot platform 1 has a robot 3, a platform 4 which can be moved on a floor in a horizontal movement direction, and a height adjustment unit 5, arranged on the platform 4, for vertically adjusting the robot 3. The robot 3 is arranged in a vertically adjustable fashion on the height adjustment unit 5. A first robot limb 9 of the robot 3 can be fastened to a vertically adjustable part of the height adjustment unit 5. The robot 3 has robot kinematics 6 for positioning an end effector 7. The robot kinematics 6 have a first robot joint 8 with a first robot limb 9, which is mounted ahead of the first robot joint 8, and with a second robot limb 10, which is mounted after the first robot joint 8, and a second robot joint 11 ahead of which the second robot limb 10 is mounted and after which a third robot limb 12 is mounted. A third robot joint 13 is mounted after the third robot limb 12, and the first robot joint 8, the second robot joint 11 and the third robot joint 13 have essentially parallel rotational axes $R_1$, $R_2$, $R_3$. Reference can also be made to the description of the mobile robot platform 1.

Figure 3:
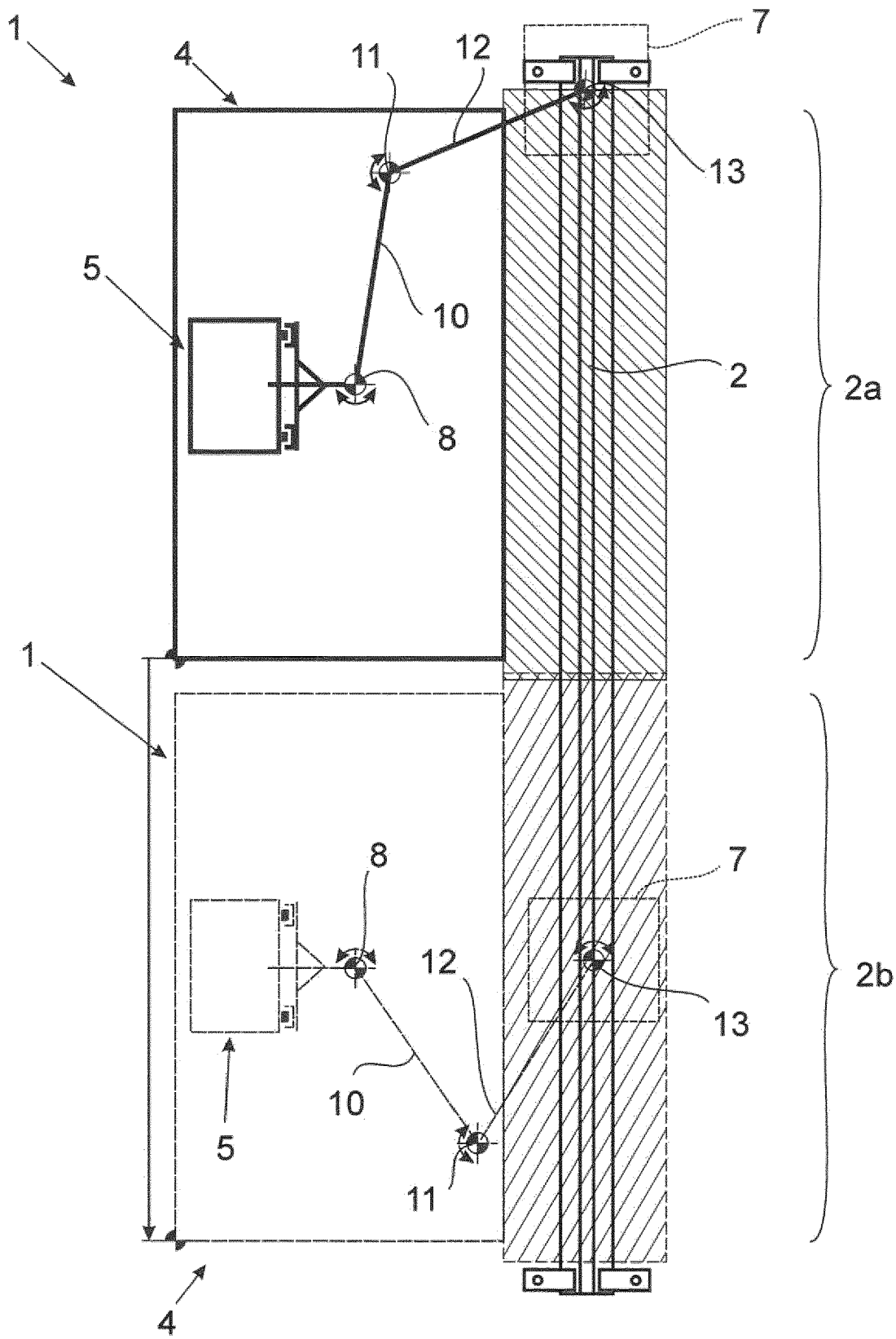
FIG. 3 shows a plan view from above in the direction of gravity of the mobile robot platform from FIG. 2 before the movement from a first processing station to a second processing station for processing one and the same aircraft structural component, FIG. 4 a) shows a further exemplary embodiment of the mobile robot platform as proposed and b) shows a further exemplary embodiment of the mobile robot platform, each as diagram of the kinematics.

The aircraft structural component 2 is now processed at a first processing station which is characterized by continuous lines in FIG. 3. If the processing is concluded at this processing station, the robot 3 can be moved into the previously described movement position or parked position here.

After the processing at the first processing station at which the mobile robot platform 1 has processed a section 2a in the working range A of the mobile robot platform 1 in the first processing station, the mobile robot platform 1 is moved along the aircraft structural component 2, such as to a second processing station. The latter is shown by dashed lines in FIG. 3. The aircraft structural component 2 can then be further processed in said second processing station in a section 2b which lies outside the working range A of the previous processing.

The movement to the second processing station can be carried out here by means of a platform positioning system. The latter can have, for example, markings which characterize the second processing station or permit positions of the second processing station to be sensed. They can be, for example, floor markings. These markings can be, for example, visual markings which are painted onto the floor B. Additionally or alternatively, centering devices can be provided in the floor B, by means of which devices the mobile robot platform 1 is positioned in the second processing station, for example by means of centering openings in the floor B, into which centering bolts of the mobile robot platform 1 engage in order to position said platform. Additionally or alternatively, RFID markings can be provided, for example in the floor B, which markings permit the mobile robot platform 1 to be positioned in the second processing station. The movement to the first and, if appropriate, further processing station can be carried out in an analogous fashion here.

After the processing station has been moved and positioned, the mobile robot platform 1 can be parked securely on the floor B. Then, the referencing of the aircraft structural component with the sensor 27 as already described above can be carried out here.

Then, as represented by dashed lines in FIG. 3, the aircraft structural component 2 is processed by the mobile robot platform 1 in a section 2b which lies outside the working range A of the first processing station.

Finally, it is also to be noted that the height adjustment unit 5, the first, second and third robot joints 8, 11, 13 and, if appropriate, the first and, if appropriate, second pivoting unit 21, 22 can each have a separate adjustment drive 5b, 11a, 13a, 21a, 22a to perform adjustments. Said adjustment drive can respectively be open-loop or closed-loop controlled separately by the respective other adjustment drives 5b, 11a, 13a, 21a, 22a.

The invention claimed is:

1. A mobile robot platform for processing an aircraft structural component with a robot, with a platform which can be moved on a floor in a horizontal movement direction, and with a height adjustment unit, arranged on the platform, for vertically adjusting the robot, the robot being arranged in a vertically adjustable fashion on the height adjustment unit and in at least one processing mode of the mobile robot platform the height adjustment unit is arranged in a non-pivoting fashion with respect to the platform, the robot having robot kinematics for positioning an end effector, and the robot kinematics having a first robot joint with a first robot limb, which is mounted ahead of the first robot joint, and with a second robot limb, which is mounted after the first robot joint, and a second robot joint ahead of which the second robot limb is mounted, and after which a third robot limb is mounted, wherein:
a third robot joint is mounted after the third robot limb, and wherein the first robot joint, the second robot joint and the third robot joint have essentially parallel rotational axes; and
the rotational axes of the first, second and third robot joints are oriented transversely with respect to the horizontal and/or parallel to the vertical adjustment direction.

2. The mobile robot platform as claimed in claim 1, wherein the height adjustment unit is linearly adjustable with respect to the horizontal.

3. The mobile robot platform as claimed in claim 1, wherein the robot is configured to be moved completely into an area within the boundaries of a vertical projection of the platform.

4. The mobile robot platform as claimed in claim 1, wherein in at least one processing position the second robot limb extends laterally beyond the platform.

5. The mobile robot platform as claimed in claim 1, wherein the end effector has at least one tool configured for drilling and/or milling the aircraft structural component and/or a riveting unit for riveting the aircraft structural component.

6. The mobile robot platform as claimed in claim 5, wherein the riveting unit and/or the drill/riveting unit has a riveting tool and a riveting opposing tool for riveting.

7. The mobile robot platform as claimed in claim 6, wherein the end effector has a U-shaped tool receptacle, the riveting tool being arranged on one limb of the U-shaped tool receptacle, and the riveting opposing tool being arranged on the other limb of the U-shaped tool receptacle.

8. The mobile robot platform as claimed in claim 7, wherein the limbs of the U-shaped tool receptacle point downward to the floor or upward from the floor.

9. The mobile robot platform as claimed in claim 1, wherein the end effector points downward to the floor or upward from the floor.

10. The mobile robot platform as claimed in claim 1, wherein the end effector has a first pivoting unit for pivoting the at least one tool about a rotational axis, wherein the rotational axis of the first pivoting unit is arranged transversely with respect to the rotational axis of the third robot joint and/or runs through the tool center point of the end effector.

11. The mobile robot platform as claimed in claim 1, wherein the end effector has a second pivoting unit for pivoting the at least one tool about a rotational axis, wherein the rotational axis of the second pivoting unit is arranged transversely with respect to the rotational axis of the first pivoting unit and/or runs through the tool center point of the end effector.

12. The mobile robot platform as claimed in claim 1, wherein the mobile robot platform is embodied so as to be self-propelled in the horizontal movement direction and/or can be moved by an external device.

13. The mobile robot platform as claimed in claim 1, wherein the mobile robot platform is supplied with power and/or compressed air from the outside.

14. The mobile robot platform as claimed in claim 1, wherein a rivet-provision unit, which provides rivet elements to the end effector via a transportation link, is arranged on the platform.

15. The mobile robot platform as claimed in claim 1, wherein the mobile robot platform comprises a sensor for referencing the position and/or attitude of the aircraft structural component relative to the mobile robot platform and/or to the robot and/or to the end effector.

16. The mobile robot platform as claimed in claim 1, wherein in at least one processing position the second robot limb extends laterally beyond the platform, wherein in at least one processing position the third robot limb is arranged laterally completely outside the platform.

17. A robot arrangement for processing an aircraft structural component with a robot, with a height adjustment unit for vertically adjusting the robot,
the robot being arranged in a vertically adjustable fashion on the height adjustment unit,
the robot having robot kinematics for positioning an end effector with at least one tool, and
the robot kinematics having a first robot joint with a first robot limb, which is mounted ahead of the first robot joint, and with a second robot limb, which is mounted after the first robot joint, and a second robot joint ahead of which the second robot limb is mounted and after which a third robot limb is mounted,
wherein
a third robot joint is mounted after the third robot limb, and wherein the first robot joint, the second robot joint and the third robot joint have essentially parallel rotational axes, and
wherein the end effector has a first pivoting unit for pivoting the at least one tool about a rotational axis, wherein the rotational axis of the first pivoting unit is arranged inclined with respect to the rotational axis of the third robot joint and/or runs through the tool center point of the end effector.

18. A method for processing an aircraft structural component with a mobile robot platform with a robot, with a platform which can be moved on a floor in a horizontal movement direction, and with a height adjustment unit, arranged on the platform, for vertically adjusting the robot,
the robot being arranged in a vertically adjustable fashion on the height adjustment unit, the robot having robot kinematics for positioning an end effector, and
the robot kinematics having a first robot joint with a first robot limb, which is mounted ahead of the first robot joint, and with a second robot limb, which is mounted after the first robot joint, and
a second robot joint ahead of which the second robot limb is mounted and after which a third robot limb is mounted,
wherein
a third robot joint is mounted after the third robot limb, and wherein the first robot joint, the second robot joint and the third robot joint have essentially parallel rotational axes, and the end effector processes the aircraft structural component.

19. The method as claimed in claim 18, wherein the mobile robot platform has a working range in which it can process a section of an aircraft structural component without being moved, wherein the aircraft structural component is arranged with one section in this working range and is processed in this section, wherein after the processing of this section the mobile robot platform is moved along the aircraft structural component, and the aircraft structural component is subsequently processed in a section which lies outside the working range of the previous processing.

* * * * *